United States Patent [19]

Unno

[11] Patent Number: 4,907,227
[45] Date of Patent: Mar. 6, 1990

[54] IN-LINE COUPLING CIRCUIT FOR A CLOSED-LOOP COMMUNICATION TERMINAL

[75] Inventor: Shohei Unno, Numazu, Japan

[73] Assignee: Tokyo Electric Co., Ltd., Tokyo, Japan

[21] Appl. No.: 139,625

[22] Filed: Dec. 30, 1987

[30] Foreign Application Priority Data

Jan. 12, 1987 [JP] Japan ..................... 62-3328

[51] Int. Cl.⁴ ............................................. G06F 11/10
[52] U.S. Cl. .................................. 371/11.2; 371/20.6
[58] Field of Search ................... 371/11, 22, 70, 66, 371/67, 47, 49, 11.1, 11.2, 21.1, 47.1, 67.1, 68.1, 49.1, 20.6; 370/13, 86, 89

[56] References Cited

U.S. PATENT DOCUMENTS

| | | | |
|---|---|---|---|
| 3,449,717 | 6/1969 | Smith | 371/70 |
| 4,186,380 | 1/1980 | Edwin | 371/11 |
| 4,498,082 | 2/1985 | Alridge | 371/11 |
| 4,538,264 | 8/1985 | Bahr | 371/11 |
| 4,605,921 | 8/1986 | Riddle | 371/47 |
| 4,633,468 | 12/1986 | Skatrud | 371/22 |
| 4,692,760 | 9/1987 | Unno et al. | |

FOREIGN PATENT DOCUMENTS 51-49386 4/1976 Japan .
59-139426 8/1984 Japan .
61-199193 9/1986 Japan .

*Primary Examiner*—Michael R. Fleming
*Attorney, Agent, or Firm*—Frishauf, Holtz, Goodman & Woodward

[57] ABSTRACT

An in-line coupling circuit for a POS terminal, includes a coupling section connected in a communication line and electrically connecting the POS terminal to the communication line. The in-line coupling circuit further includes a regeneration error check circuit for monitoring signals transmitted from and received into the POS terminal and generating an abnormal detection signal when a specified character data included in the received signal and indicating the end of a data frame is not generated from the POS terminal and a reporting circuit for generating a defective code inherent to the POS terminal in response to the abnormal detection signal and transmitting the defective code through the communication line.

10 Claims, 3 Drawing Sheets

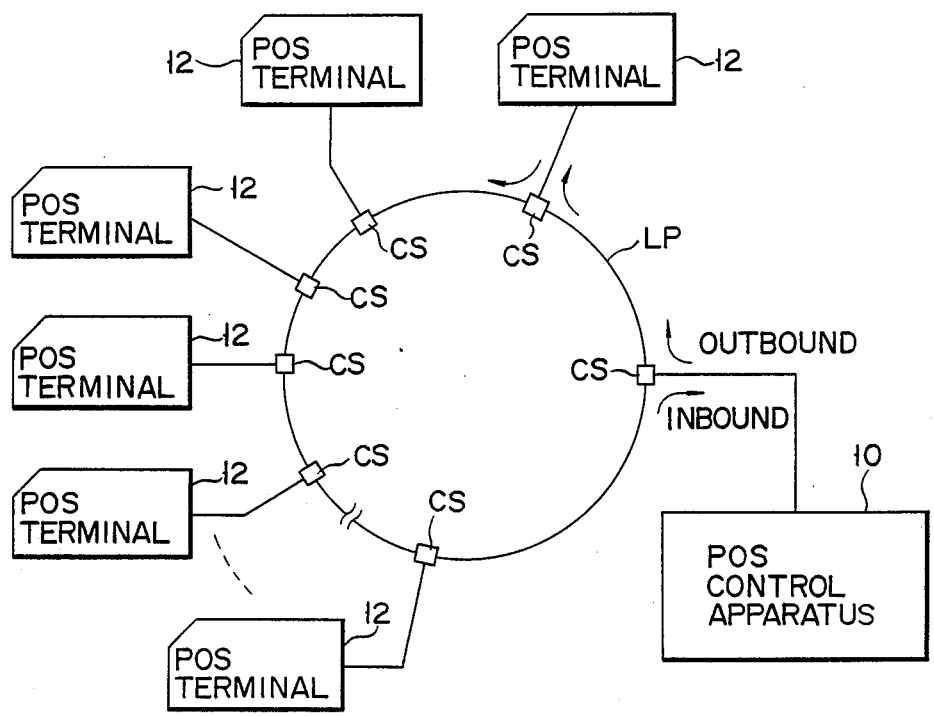
F I G. 1
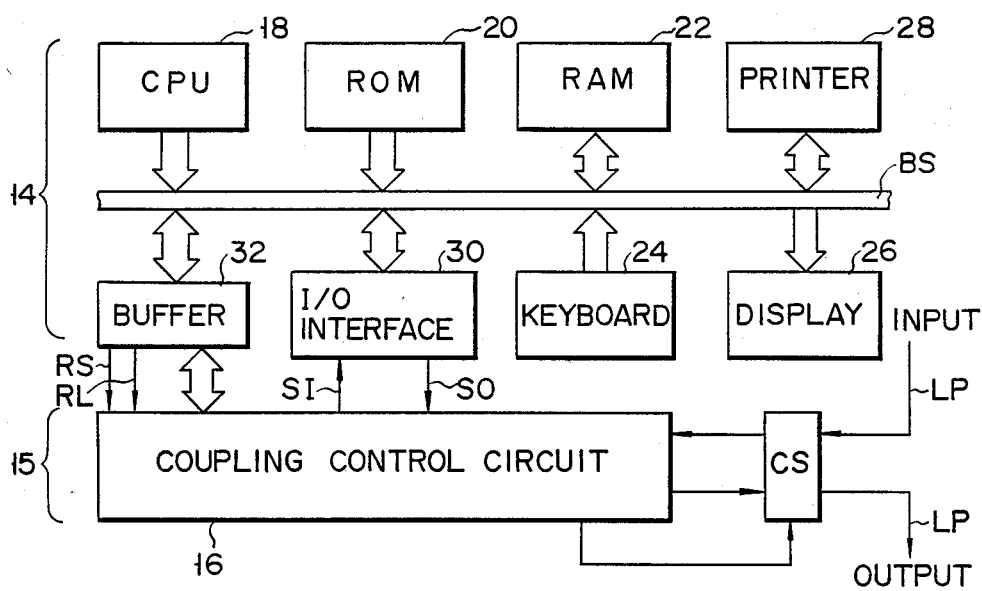
F I G. 2

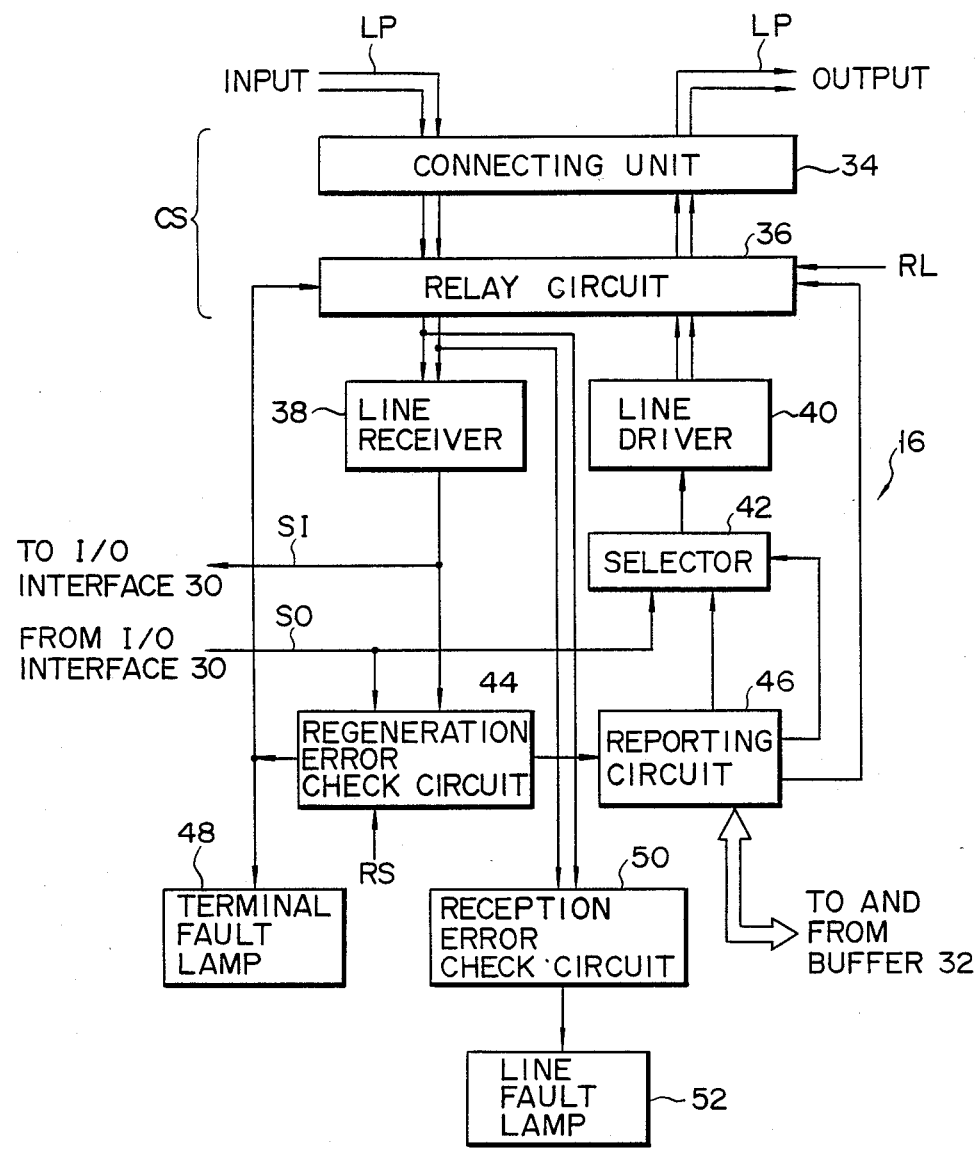
F I G. 3

IN-LINE COUPLING CIRCUIT FOR A CLOSED-LOOP COMMUNICATION TERMINAL

BACKGROUND OF THE INVENTION

This invention relates to a closed-loop or ring type communication system, and more particularly to an in-line coupling circuit incorporated in the closed-loop type communication terminal.

In department stores or supermarkets, Point of Sale (POS) system is used to efficiently process the clerical work such as sales price administration, stock administration, sales totalization. The POS system generally includes POS control or administration apparatus arranged in the central office of the store and a plurality of POS terminals arranged as electronic cash registers at the counters. The POS control apparatus and POS terminals are serially connected via communication line to form a closed loop. The POS terminal at each counter makes contact with the POS control apparatus in order to inquire the name and unit price of articles to be sold of the POS control apparatus and inform the POS control apparatus of sales information such as the number and sales amount of the sold articles. Further, when the POS control apparatus receives the sales information, it writes data into the file in order to perform the stock administration and sales totalization according to the received sales information.

Now, data communication between the POS control apparatus and POS terminals is explained in more detail. The POS control apparatus periodically generates a polling signal and gives opportunities to the POS terminals in the closed loop to transmit data. When a polling signal is transmitted from the POS control apparatus to one end of the communication line, it is fed through the closed loop, and transmitted from the other end of the communication line to the POS control apparatus. In this case, the POS terminal located in the most upstream position receives a polling signal generated from the POS control apparatus and transmits the polling signal to the POS terminal located in the downstream position. Thus, the polling signal is sequentially supplied to and transmitted from the POS terminals from the upstream to the downstream. Then, the polling signal supplied to the POS terminal located in the most downstream position is transmitted from the POS terminal to the POS control apparatus. A time slot between the two successive polling signals is divided into subslots which are respectively assigned to the POS control apparatus and POS terminals so that a frame of transmission data can be transmitted immediately after the preceding polling signal. When the POS control apparatus is required to make contact with any one of the POS terminals, it transmits transmission data at a time corresponding to the assigned subslot. Likewise, if the POS terminal is required to make contact with the POS control apparatus, it transmits transmission data at a time corresponding to the subslot assigned to the POS terminal. Further, each of the POS control apparatus and the POS terminals adds a GA character indicating the end of data frame to the end of the transmission data. In the prior art POS system, each of the POS terminals has an in-line display lamp which is lit when it receives the polling signal. When the power source of the POS terminal to be used is turned on, the in-line display lamp is lit to indicate that the POS terminal is set in the in-line coupling state in which it can be communicated with the POS control apparatus. The period in which the in-line lamp is kept lit is set slightly longer than the interval at which the polling signal is generated. Therefore, the in-line display lamp is kept lit in the case where the polling signal is repeatedly received. However, if the polling signal is interrupted, the in-line lamp is turned off. Therefore, the operator of the POS terminal can infer from the turn-off of the in-line display lamp that something abnormal occurs in the POS system.

In the POS system, if one of the POS terminals becomes defective, none of the other POS terminals can be operated at the same time, making the sales service confused. In this case, the in-line display lamps of the POS terminals locating in the downstream of the defective POS terminal are all turned off. Therefore, the operator of the POS control apparatus had to sequentially make contact with the POS terminals by telephone, for example, and check whether or not the in-line display lamp of each POS terminal is lit until the defective POS terminal is detected. Thus, it generally takes a long time to start the substantial restoring operation for the POS system.

SUMMARY OF THE INVENTION

An object of this invention is to provide an in-line coupling circuit for a closed-loop communication terminal which can shorten the time required for restoring the closed-loop communication system which includes a defective terminal and becomes inoperative.

According to this invention, this object can be attained by an in-line coupling circuit for a closed-loop communication terminal, including a coupling circuit for electrically connecting the communication terminal to a communication line; a monitor circuit for monitoring signals transmitted from and received into the communication terminal and generating an abnormal detection signal when it is detected that a specified character data included in the received signal and indicating the end of a data frame is not generated from the communication terminal and a reporting circuit for generating a defective code inherent to the communication terminal in response to the abnormal detection signal from the monitor circuit and transmitting the defective code through the communication line.

In the in-line coupling circuit, an abnormal detection signal is generated from the monitor circuit when a closed-loop communication terminal becomes defective and the reporting circuit transmits a defective code via the communication line in response to the abnormal detection signal. It is easy to determine the communication terminal which is defective in the in-line communication system based on the defective code, and therefore the restoration operation for the communication system can be immediately started.

BRIEF DESCRIPTION OF THE DRAWINGS

FIG. 1 is a diagram schematically showing the POS system which includes POS terminals having an in-line coupling circuit according to one embodiment of this invention;

FIG. 2 is a circuit diagram showing the circuit construction of the POS terminal shown in FIG. 1;

FIG. 3 is a diagram schematically showing the circuit construction of a coupling control circuit and coupling section shown in FIG. 2.

DETAILED DESCRIPTION OF THE PREFERRED EMBODIMENTS

Figure 4:
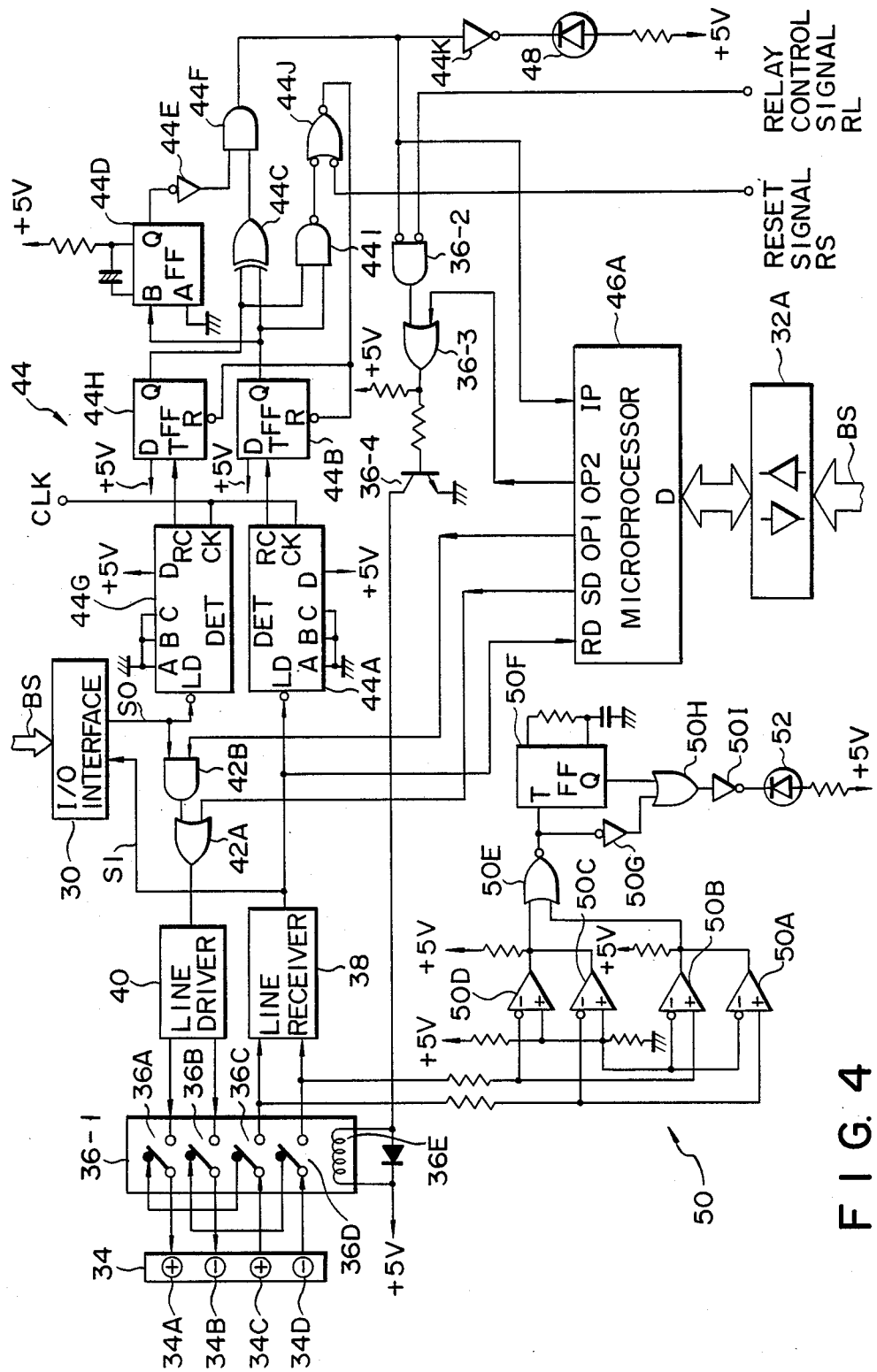
FIG. 4 is a diagram showing circuit elements shown in FIG. 3 more in detail.

There will now be described an embodiment of this invention with reference to FIGS. 1 to 4. FIG. 1 is a block diagram showing the POS system in its entirety. The POS system includes POS control or administration apparatus 10 and a plurality of electronic cash registers acting as POS terminals 12 which are interposed in two-wire type communication line LP via coupling sections CS. POS control apparatus 10 and POS terminals 12 are serially connected to form a closed loop.

Each of POS terminals 12 is constructed as shown in FIG. 2. POS terminal 12 includes main body circuit 14 and in-line coupling circuit 15. Main body circuit 14 includes CPU 18, ROM 20, RAM 22, keyboard 24, display 26 and printer 28 which are connected to each other via bus line BS. Control programs for CPU 18 are stored in ROM 20 and sequentially read out and executed by CPU 18. Thus, CPU 18 may perform various processing operations. RAM 22 is used to store various data such as sales data representing the sales transaction and processed by CPU 18. Keyboard 24 has various registration keys including numeral keys and a total key. Display 26 is used to display the name of article, unit price, total amount of money and the like, and printer 28 is used to print the article name, the unit price and the number of the sold articles on a receipt and issue the receipt. Main body circuit 14 includes I/O interface 30 serving as communication control unit which performs serial data transfer between POS control apparatus 10 and main body circuit 10. Interface 30 is electrically connected to communication line LP via in-line coupling circuit 15 for data transmission and reception. Further, in-line coupling circuit 15 includes coupling control circuit 16 and coupling section CS. Coupling control circuit 16 is connected to bus line BS via buffer 32.

FIG. 3 schematically shows the construction of coupling control circuit 16 and coupling section CS.

Coupling section CS includes connection port 34 and relay circuit 36, and coupling control circuit 16 includes line receiver 38, line driver 40, selector 42, regeneration error check circuit 44, reporting circuit 46, terminal fault lamp 48, reception error check circuit 50 and line fault lamp 52. Connection port 34 receives a signal including polling signal and GA character data via communication line LP. The reception signal is transmitted to I/O interface 30 via replay circuit 36 and line receiver 38. In contrast, a transmission signal is transmitted from I/O interface 30 to communication line LP via selector 42, line driver 40, relay circuit 36 and connection port 34. Further, a reception signal is supplied from replay circuit 36 not only to line receiver 38 but also to reception error check circuit 50.

Reception error check circuit 50 turns on line fault lamp 52 indicating that communication line LP is defective when the reception signal includes an abnormal component. Transmission signal and reception signal are respectively supplied from I/O interface 30 and line receiver 38 to regeneration error check circuit 44. Error check circuit 44 is used to generate an abnormal detection signal when a polling signal included in the reception signal is not generated from main body circuit 14. Terminal fault lamp 48 is turned on in response to the abnormal detection signal to indicate that the terminal is defective. Relay circuit 36 electrically isolate communication line LP from terminal 12 or line receiver 38 and line driver 40 in response to the abnormal detection signal. Further, reporting circuit 46 includes a microprocessor connected to error check circuit 44 to receive the abnormal detection signal.

FIG. 4 is a detail circuit diagram of in-line coupling circuit 15. Connection port 34 has transmission terminals 34A and 34B respectively connected to common terminals of contacts 36A and 36B in relay 36-1 of relay circuit 36 and reception terminals 34C and 34D respectively connected to common terminals of contacts 36C and 36D of relay 36-1. The normally open terminals of contacts 36A and 36B of relay 36-1 are connected to an output terminal of line driver 40, and the normally open terminals of contacts 36C and 36D are connected to an input terminal of line receiver 38. The normally closed terminals of contacts 36A and 36C are connected to each other and the normally closed terminals of contacts 36B and 36D are connected to each other. When driving coil 36E is energized, relay 36-1 is set to a state in which the common terminals in contacts 36A to 36D are connected to the normally open terminals.

A (+) side reception signal input from the normally open terminal of contact 36C of relay 36-1 is supplied first input terminals of comparators 50A and 50C of reception error check circuit 50, and a (−) side reception signal input from the normally open terminal of contact 36D is supplied to first input terminals of comparators 50B and 50D of reception error check circuit 50. Second input terminals of comparators 50A to 50D are connected to receive a reference voltage, and a pull-up voltage is applied to output terminals thereof. Output signals from comparators 50A to 50D are supplied to NOR gate 50E. With this connection, when at least one of the input signals exceeds the reference voltage, an "L" level signal is supplied to NOR gate 50E. An output signal of NOR gate 50E is supplied to trigger terminal T of monostable multivibrator circuit 50F and to one input terminal of OR gate 50H via inverter 50G. An output signal from monostable multivibrator circuit 50F is supplied to the other input terminal of OR gate 50H which in turn produces an output signal to display lamp 52 formed of a light emitting diode (LED) via inverter 50I.

The reception signal is supplied from line receiver 38 to I/O interface 30 and to load terminal LD of shift register 44A. Clock terminal CK of shift register 44A is connected to receive transmission and reception clock signal CLK. Shift register 44A is used to detect specified character data indicating the end of data frame or GA character data constituted by a specified number of successive pulses included in the reception signal. When shift register detects the GA character data, an "H" level detection signal is supplied from output terminal RC to trigger terminal T of flip-flop 44B at the next stage, setting flip-flop 44B. An output signal from flip-flop 44B is supplied to a first input terminal of exclusive-OR gate 44C and to trigger terminal B of monostable multivibrator circuit 44D. An output signal from monostable multivibrator circuit 44D is supplied to a first input terminal of AND gate 44F via inverter 44E.

I/O interface 30 derives output data of POS control apparatus 10 from reception signal and supplies it to CPU 18. In the case where CPU 18 is required to respond to the received output data, it generates response data to I/O interface 30. I/O interface 30 regenerates the received signal as a transmission signal and adds response data to the transmission signal at a specified timing assigned with the polling signal used as reference timing. The transmission signal is supplied to line driver 40 via AND gate 42B and OR gate 42A. In contrast, when CPU 18 is not required to respond to the received data form POS control apparatus 10, I/O interface 30 regenerates the received signal as a transmission signal and supplies the transmission signal to line driver 40. Thus, the transmission signal supplied from I/O interface 30 always includes the reception signal supplied from line receiver 38. In other words, output data from POS control apparatus 10 and POS terminal in the upstream are kept contained together with the polling signal in the transmission signal.

The transmission signal is supplied to line driver 40 and to load terminal LD of shift register 44G. Shift register 44G is constructed in the same manner as shift register 44A and used to detect GA character data included in each data frame of the transmission signal. When the GA character is detected, shift register 44G supplies a "H" level output signal from output terminal RC to flip-flop 44H to set flip-flop 44H. An output signal of flip-flop 44H is supplied to a second input terminal of exclusive-OR gate 44C whose output signal is supplied to a second terminal of AND gate 44F.

Output signals from flip-flops 44B and 44H are supplied to each of reset terminals R of flip-flops 44B and 44H via NAND gate 44I and OR gate 44J. Therefore, when flip-flops 44B and 44H are both set, both of flip-flops 44B and 44H are reset. In this case, a second input terminal of OR gate 44J is connected to receive a reset signal RS which is generated manually or from CPU 10 and forcedly resets flip-flops 44B and 44H.

An output signal of AND gate 44F is supplied as an output signal of regeneration error check circuit 44 to display lamp 48 formed of a light emitting diode via inverter 44K and to a first input terminal of NAND gate 36-2. The second input terminal of NAND gate 36-2 is connected to receive control signal RL which is generated from CPU 18 to control the operation of relay 36-1. An output signal of NAND gate 36-2 is supplied via OR gate 36-3 to the base of transistor 36-4 which controls a current flowing through driving coil 36E of relay circuit 36-1.

An output signal from NAND gate 44J of regeneration error check circuit 44 is supplied to input terminal IP of microprocessor 46A constituting reporting circuit 46. Microprocessor 46A receives at signal input terminal RD a reception signal generated from line receiver 38 and transmits at signal output terminal SD a defective or fault code inherent to the terminal as a transmission signal to line driver 40 via OR gate 42A. Further, microprocessor 46A supplies conduction signals from output terminals OP1 and OP2 to AND gate 42B and OR gate 36-3. Microprocessor 46A is connected at data input terminal D to bus line BS via driver/receiver 32A constituting buffer 32.

The defective or fault code is constituted by a combination of status data indicating a defective state and the number of the terminal. The terminal number is input to data input terminal D from CPU 18 via driver/receiver 32A when POS terminal 12 is triggered. The terminal number thus input is stored in the storing section of microprocessor 32A.

Now, the operation of the in-line coupling circuit of the POS terminal thus constructed is explained. First, in the case where POS terminal 12 is not turned on, no current is conducted through driving coil 36E of relay 36-1 and each of contacts 36A to 36D of relay 36-1 is set on the normally closed terminal side. At this time, POS terminal 12 is completely isolated from communication line LP. Further, signal receiving terminals 34C and 34D of connection port 34 are electrically connected to signal transmission terminals 34A and 34B so that a signal in transmission can pass through the coupling section from the signal receiving side to the signal transmission side.

Next, when POS terminal 12 is turned on, CPU 18 performs various initialization processings and transmits relay control signal RL of "L" level to NAND gate 36-2 of in-line coupling circuit 15. Then, transistor 36-4 is turned on to cause a current to flow through driving coil 36E. This activates relay 36-1 to set contacts 36A to 36D on the normally open terminal side. As a result, two ends of communication line LP on the upstream and downstream sides are electrically connected to main body circuit 14 of POS terminal 12 via line receiver 38 and line driver 40, respectively. When the power source for the entire POS system is turned on and if a signal including a polling signal generated from POS control apparatus 10 is received at signal receiving terminals 34C and 34D, the received signal is supplied to main body circuit 14 of POS terminal 12 via relay 36-1 and line receiver 38 and to reception error check circuit 50 via relay 36-1. If the received signal has a correct signal level exceeding a specified voltage level, an output signal of NOR gate 50E will be at "H" level. Therefore, output signals of monostable multi-vibrator circuit 50F and inverter 50A are set at "L" level. Thus, display lamp 52 indicating that communication line LP is defective is kept turned off. Further, the received signal is supplied from line receiver 38 to shift register 44A of regeneration error check circuit 44. Then, shift register 44A generates an "H" level signal to set flip-flop 44B when it detects the GA character in the received signal. When flip-flop 44B is set, an "H" level signal is generated from monostable multivibrator circuit 44D for a delay time T determined by the time constant of a resistor and a capacitor. This causes an "L" level signal to be supplied to a first input terminal of AND gate 44F. At this time, the logic condition of input signals to exclusive-OR gate 44C is satisfied and an "H" level signal is supplied from exclusive-OR gate 44C to AND gate 44F. At this time, however, the logic condition of input signals to AND gate 44F is not satisfied, and AND gate 44F is kept disabled.

The received signal is regenerated from I/O interface 30 of the POS terminal and then supplied as a transmission signal to line driver 40 and shift register 44G. Shift register 44G supplies an output signal of "H" level to set flip-flop 44H when it detects a GA character in the transmission signal. When flip-flop 44H is set, an "H" level signal is supplied from flip-flop 44H to exclusive-OR gate 44C. Therefore, a logic condition of input signals to exclusive-OR gate 44C is not satisfied, that is, exclusive-OR gate 44C is disabled and the output signal is set to an "L" level. In this case, AND gate 44F is also disabled. In contrast, NAND gate 44I is enabled to reset flip-flops 44B and 44H.

When delay time T has elapsed, an output signal of monostable multivibrator circuit 44D is changed from "H" level to "L" level, supplying an "H" level signal to AND gate 44F. In this case, however, since AND gate 44F is supplied with an output signal from exclusive-OR gate 44C which has been set to "L" level, AND gate 44F is kept disabled. Therefore, at this time, display lamp 40 for indicating that the POS terminal is defective is not turned on.

In the case where an accident occurs in communication line LP and the signal level of the received signal becomes lower than the specified voltage, an output signal from NOR gate 50E of reception error check circuit 50 changes to "H" level. Then, when a specified time determined by the time constant of monostable multivibrator circuit 50F has elapsed after the output signal of NOR gate 50E is changed to "H" level, display lamp 52 is turned on.

In the case where main body circuit 14 of POS terminal 12 becomes defective, I/O interface 30 cannot regenerate the received signal as a transmission signal. Even if shift register 44A detects the GA character in the received signal and sets flip-flop 44B, shift register 44G will not detect the GA character in the transmission signal, thus keeping flip-flop 44H in the reset state. Therefore, an output signal of exclusive-OR gate 44C is kept at "H" level. When delay time T has elapsed after flip-flop 44B is set, an output signal of monostable multivibrator circuit 44D changes to "L" level to enable AND gate 44F. This turns on display lamp 48 for indicating that the POS terminal is in trouble.

Further, when an abnormal detection signal of "H" level is generated from AND gate 44F, NAND gate 36-2 is disabled, turning off transistor 36-4. When transistor 36-4 is turned off, current supply to driving coil 36E of relay 36-1 is interrupted, setting contacts 36A to 36D of relay 36-1 to the normally closed terminal side. As a result, POS terminal 12 which is in trouble is electrically isolated from communication line LP. At the same time, receiving terminals 34C and 34D of connection port 34 are connected to transmission terminals 34A and 34B. Therefore, there occurs no open circuit in communication line LP, and the POS system can perform the normal function using POS terminals 12 except the one which is in trouble.

When an "H" level abnormal detection signal is supplied from AND gate 44F of regeneration error check circuit 44 to input terminal IP of microprocessor 46A, microprocessor 46A generates an "L" level output signal from output terminal OP1 to disable AND gate 42B, inhibiting I/O interface 30 from generating at transmission signal.

While I/O interface 30 is kept inhibited from generating a transmission signal, microprocessor 46A generates an "H" level output signal from output terminal OP2 to turn on transistor 36-4. Then, relay 36-1 is activated to electrically connect line driver 40 and line receiver 38 to communication line LP. In this condition, when the reception signal from POS control apparatus 10 is supplied to line receiver 38 and then to signal input terminal RD of microprocessor 46A, micro-processor 46A regenerates the reception signal as a transmission signal, adds a defective code or fault code to the transmission signal and generates the transmission signal thus obtained from output terminal SD. The transmission signal is supplied from output terminal SD to communication line LP via line driver 40 and relay 36-1. Then, microprocessor 46A generates an "L" level signal from output terminal OP2 to turn off transistor 36-4. The defective code generated from POS terminal 12 is supplied to POS control apparatus 10.

As described above, when communication line is in trouble, display lamp 52 is turned on, and when main body circuit of the POS terminal becomes defective, display lamp 48 is turned on. In the case where main body circuit 14 becomes defective, the operator of POS control apparatus 10 can easily find out which one of the POS terminals in the POS system is in trouble according to the defective code. Therefore, the time for starting to repair the POS terminal in trouble can be shortened. Further, since the POS terminal in trouble is isolated from communication line LP immediately after the defective code is transmitted, it will not further affect the operation of the POS system. That is, after the POS terminal in trouble is isolated, the POS loop can be constituted by the remaining POS terminals, and the sales operation can be continuously effected using the remaining normal POS terminals.

As described above, since display lamp 48 of the POS terminal is turned on when main body circuit 14 becomes defective, and at the same time the POS terminal is isolated from communication line LP, the sales series will not be confused even if it takes a long time to repair the POS terminal.

What is claimed is:

1. An in-line coupling circuit for coupling a closed-looped communication terminal to a communication line, comprising:
   coupling means inserted in said communication line, for electrically coupling said closed-loop communication terminal to said communication line, and including means for transferring to said closed-loop communication terminal a reception signal supplied from an upstream portion of said communication line, and means for transferring to a downstream portion of said communication line a transmission signal generated by said closed-loop communication terminal in response to said reception signal;
   monitoring means, coupled to receive said reception signal and said transmission signal, for monitoring specified character data included in each of said reception and transmission signals for indicating the end of a data frame, and for generating an abnormal detection signal when said monitoring means detects that said communication terminal has not responded to said reception signal within a predetermined period of time; and
   reporting means for generating a defective code inherent to said closed-loop communication terminal in response to said abnormal detection signal from said monitoring means, and for transferring said generated defective code to the downstream portion of said communication line.

2. An in-line coupling circuit according to claim 1 wherein said coupling means includes a relay circuit means for isolating said closed-loop communication terminal from said communication line in response to said abnormal detection signal.

3. An in-line coupling circuit according to claim 1 wherein said coupling means includes a relay circuit means for electrically isolating said closed-loop communication terminal from said communication line in response to said abnormal detection signal, and for forming a transmission path which permits a signal transmitted in said communication line to be passed therethrough.

4. An in-line coupling circuit according to claim 3, wherein said reporting means includes control circuit means for generating said defective code in response to said abnormal detection signal and for controlling said relay circuit means to transmit said defective code to said communication line.

5. An in-line coupling circuit according to claim 4, wherein said closed-loop communication terminal is a POS terminal.

6. A closed-loop communication system comprising:
a communication line;
a plurality of in-line coupling circuits;
a plurality of communication terminals electrically coupled to said communication line via respective in-line coupling circuits to form a closed loop; and
a communication control apparatus connected to said communication line, for performing communication control processing operations for giving opportunities to said communication terminals in said closed loop to transmit data; and
wherein each of said in-line coupling circuits includes:
coupling means inserted in said communication line, for electrically coupling said closed-loop communication terminal to said communication line, and including means for transferring to said closed-loop communication terminal reception signal supplied from an upstream portion of said communication line, and means for transferring to a downstream portion of said communication line a transmission signal generating by said communication terminal in response to said reception signal,
monitoring means, coupled to receive said reception signal and said transmission signal, for monitoring specified character data included in each of said reception and transmission signals and for indicating the end of a data frame, and for generating an abnormal detection signal when said monitoring means detects that said communication terminal has not responded to said reception signal within a predetermined period of time, and
reporting means for generating a defective code inherent to said communicating terminal in response to said abnormal detection signal from said monitoring means, and for transferring said generated defective code to the downstream portion of said communication line.

7. A closed-loop communication system according to claim 6, wherein each of said coupling means includes a relay circuit means for isolating said respective closed-loop communication terminals from said communication line in response to said abnormal detection signal.

8. A closed-loop communication system according to claim 6, wherein each of said coupling means includes a relay circuit means for electrically isolating said respective closed-loop communication terminals from said communication line in response to said abnormal detection signal, and for forming a transmission path which permits a signal transmitted in said communication line to be passed therethrough.

9. A closed-loop communication system according to claim 8, wherein said reporting means includes control circuit means for generating said defective code in response to said abnormal detection signal and for controlling said relay circuit means to transmit said defective code to said communication line.

10. A closed-loop communication system according to claim 9, wherein said closed-loop communication terminals each comprise a POS terminal.

* * * * *